United States Patent
DiLuciano et al.

(10) Patent No.: US 8,587,147 B2
(45) Date of Patent: Nov. 19, 2013

(54) SAFETY SYSTEM

(71) Applicant: Johnson Industries, Inc., Pikeville, KY (US)

(72) Inventors: Mark A. DiLuciano, Amherst, OH (US); Jerry O. Thacker, Shelby Gap, KY (US); George F. Johnson, Jr., Pikeville, KY (US)

(73) Assignee: Johnson Industries, Inc., Pikeville, KY (US)

( * ) Notice: Subject to any disclaimer, the term of this patent is extended or adjusted under 35 U.S.C. 154(b) by 0 days.

(21) Appl. No.: 13/677,753

(22) Filed: Nov. 15, 2012

(65) Prior Publication Data

US 2013/0214618 A1 Aug. 22, 2013

Related U.S. Application Data

(60) Provisional application No. 61/633,748, filed on Feb. 17, 2012.

(51) Int. Cl.
*B60L 1/00* (2006.01)

(52) U.S. Cl.
USPC .......................... 307/10.1; 307/326

(58) Field of Classification Search
USPC ...................... 307/10.2, 10.1, 326
See application file for complete search history.

(56) References Cited

U.S. PATENT DOCUMENTS

| 891,947 A | 6/1908 | McCollum |
| 2,973,050 A | 2/1961 | Bennett |
| 3,818,292 A | 6/1974 | Berman |
| 4,414,937 A | 11/1983 | Ueda et al. |
| 5,053,768 A | 10/1991 | Dix, Jr. |

(Continued)

FOREIGN PATENT DOCUMENTS

| CN | 2600599 | 1/2004 |
| DE | 19603648 | 8/1997 |

(Continued)

OTHER PUBLICATIONS

Screenshot, electricmotorsport.com, EV Parts, Throttles, EZ-GO Pot Box, dated 2010, printed Apr. 27, 2012.

(Continued)

*Primary Examiner* — Robert L. Deberadinis
(74) *Attorney, Agent, or Firm* — Frost Brown Todd LLC

(57) ABSTRACT

A safety system comprises an activation mechanism, a safety circuit, and a drive system in communication with each other. In one embodiment, the activation mechanism produces an activation signal in response to an actuation of the activation mechanism. The safety circuit operates in either a locked state or a normal operation state. In this embodiment, the safety circuit is programmed to prevent the activation signal from being communicated to the drive system when the safety circuit is operating in the locked state and to allow the activation signal to be communicated to the drive system when the safety circuit is operating in the normal operation state. The safety circuit is programmed to transition from the locked state to the normal operation state in response to receiving both an unlocking code and a follow-up signal that is received by the safety circuit within a predetermined amount of time. The safety circuit may be further programmed to transition from the normal operation state to the locked state in response to the safety circuit failing to receive an activation signal within a second predetermined amount of time.

21 Claims, 5 Drawing Sheets

(56) References Cited

U.S. PATENT DOCUMENTS

| | | |
|---|---|---|
| 5,341,894 A | 8/1994 | Van Gorder, Jr. et al. |
| 5,343,077 A | 8/1994 | Yoshida et al. |
| 5,359,515 A | 10/1994 | Weller et al. |
| 5,447,133 A | 9/1995 | Kamio et al. |
| 5,505,528 A | 4/1996 | Hamman et al. |
| 5,790,015 A * | 8/1998 | Iitsuka .................... 340/426.28 |
| 5,797,467 A | 8/1998 | Watanabe |
| 5,808,375 A | 9/1998 | Armbruster et al. |
| 5,835,868 A | 11/1998 | McElroy et al. |
| 5,842,364 A | 12/1998 | Oliver |
| 5,912,631 A * | 6/1999 | Kusunoki .................... 340/5.64 |
| 6,621,175 B1 | 9/2003 | Kuroda et al. |
| 6,636,145 B1 * | 10/2003 | Murakami et al. ............ 340/5.9 |
| 6,802,232 B2 | 10/2004 | Buckley et al. |
| 6,840,352 B2 | 1/2005 | Buckley et al. |
| 7,243,630 B2 | 7/2007 | Boe et al. |
| 7,407,464 B2 | 8/2008 | Tanioka et al. |
| 7,480,569 B2 | 1/2009 | Wehrlen et al. |
| 7,710,108 B2 | 5/2010 | Keller et al. |
| 7,750,497 B2 | 7/2010 | Hashimoto et al. |
| 7,803,088 B2 | 9/2010 | Nakamoto et al. |
| 8,001,944 B2 | 8/2011 | Yagyu |
| 8,120,291 B2 | 2/2012 | Clark et al. |
| 8,121,762 B2 | 2/2012 | Gierling et al. |
| 2004/0163432 A1 | 8/2004 | Atthaprasith |
| 2008/0041128 A1 | 2/2008 | Ohtaki et al. |
| 2011/0017165 A1 | 1/2011 | Osawa et al. |
| 2011/0071732 A1 | 3/2011 | Erb et al. |
| 2011/0087414 A1 | 4/2011 | Shiomi et al. |

FOREIGN PATENT DOCUMENTS

| | | |
|---|---|---|
| JP | 2009-146039 A | 7/2009 |
| JP | 2010-241284 A | 5/2010 |
| WO | WO 2010/047624 A1 | 4/2010 |

OTHER PUBLICATIONS

English Abstract of Chinese Application No. CN 2600599.
English Abstract of German Application No. DE 19603648.
English Abstract of Japanese Application No. JP 2010-241284 A.
International Search Report dated Apr. 29, 2013 for application No. PCT/US2013/020737.
Written Opinion dated Apr. 29, 2013 for application No. PCT/US2013/020737.

* cited by examiner

SAFETY SYSTEM

PRIORITY

This application claims priority to U.S. Provisional Patent Application Ser. No. 61/633,748, filed Feb. 17, 2012, entitled "Pulse Pedal," the disclosure of which is incorporated by reference herein.

BACKGROUND

Electric vehicles, unlike gasoline or diesel powered vehicles are virtually impossible to detect if they are "on" while stationary because they make no discernible sounds. Many times people exit these electric vehicles after using them, leaving the vehicle in gear (i.e. having a direction selected, either forward or reverse), and not turning off the key-switch. When these vehicles are left in gear and the key-switch is on, any unwanted person pushing or any object hitting, falling on, bumping, or moving the accelerator pedal will cause the vehicle to move in the direction selected. In some instances a "falling" or "thrown" object can get lodged between the accelerator and another part of the vehicle thereby depressing the accelerator and causing the vehicle to move in the selected direction in an uncontrolled manner. This poses a very dangerous situation in that the vehicle can run over, injure, mutilate, or kill anyone in its path.

Embodiments of the present invention may safeguard and prevent electric vehicles that are left in gear with the power on from moving in any direction unless the accelerator is intentionally depressed by the operator.

Embodiments of the present invention may also be used with gasoline powered vehicles that start the engine when the accelerator is depressed with the key-switch on. After depression of the accelerator, this type of vehicle will then move in the direction selected. The engine then stops running when the accelerator is released. Similar to the electric vehicles discussed above, this type of vehicle also poses a threat if it remains in gear with the power on when vacated, because if the accelerator is pressed unintentionally (either by an operator or a foreign object), then the vehicle will move in the selected direction. Accordingly, embodiments of the present invention may be used to help prevent this type of vehicle from moving in any direction unless the accelerator is intentionally depressed by the operator.

Still other embodiments of the present invention may be used with industrial equipment, including but not limited to hand tools and machinery, which utilizes an on/off switch in conjunction with an activation mechanism, such as a trigger or pedal, to activate the machinery or component thereof. By way of example only, some brake presses require the operator to depress a foot pedal to activate the brake motion and some table saws require the operator to depress a foot pedal to activate the saw. Similar to the vehicles described above, this type of equipment can pose a significant hazard if it operates when the equipment is left on and the activation mechanism is unintentionally depressed/activated either by an operator or foreign object. Accordingly, embodiments of the present invention may be used to help prevent this type of equipment from being activated unless the activation mechanism is intentionally depressed/activated by the operator.

While a variety of safety systems have been made and used, it is believed that no one prior to the inventors have made or used an invention as described herein.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

Figure 1:
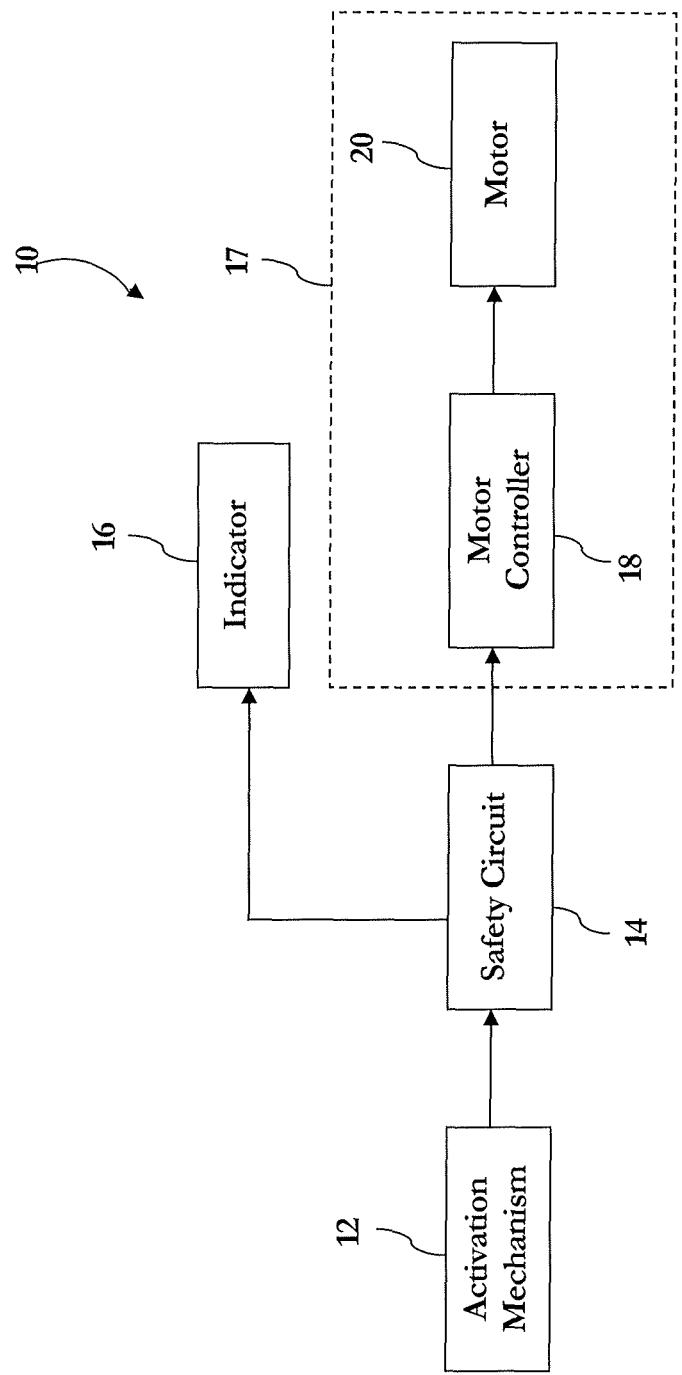
FIG. 1 depicts a block diagram of a safety system, according to one embodiment of the present invention.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Many prior art mechanical and electrical devices, including but not limited to vehicles and industrial equipment, include both an on/off switch and an activation mechanism, such as a pedal, trigger, switch, knob, slide or other suitable mechanism that includes a sensor or switch configured to detect when the activation mechanism is actuated and produce a corresponding activation signal. The activation signal is then communicated to the motor controller or solenoid to indicate that the activation mechanism has been actuated. An activation signal can include any type of signal created by actuation of an activation mechanism, including an electrical signal, that indicates that the activation mechanism has been actuated. The activation mechanism may also be configured to provide other input(s) to the motor controller or solenoid, such as input controlling the level of operation of the motor or engine. For example, in some devices, the rate of speed that the motor or engine is operating at may correspond to the degree of actuation of the activation mechanism.

In these devices, when the on/off switch is in the "on" position, the device is generally ready to be operated by depressing or otherwise actuating the activation mechanism. In such a configuration, the activation mechanism is generally in direct communication with the device's motor controller and/or solenoid such that when the activation mechanism is depressed or otherwise actuated, one or more input signals are provided to the motor controller or solenoid and then the motor controller communicates an appropriate operation signal to the motor and the motor begins operating or the solenoid is engaged and the engine is started.

In some devices, the motor controller or solenoid may be configured to ignore other inputs from the activation mechanism or other input devices unless the motor controller or solenoid is also simultaneously receiving an activation signal indicating that the activation mechanism is currently being actuated. For example in electric vehicles, the motor controller may include a controller enable pin that is configured to respond to the activation signal. When the controller enable pin is enabled (i.e. when it is receiving the activation signal), then the motor controller processes other inputs and correspondingly operates the motor. When the controller enable pin is not enabled (i.e. when it is not receiving the activation signal), then the motor controller ignores other inputs thereby rendering the motor inoperable. This may serve as a minimal safety feature. However it would not prevent unintended operation of the device if the activation mechanism is unintentionally actuated by an operator or foreign object (e.g. if a piece of debris fell on an accelerator pedal in an un-manned vehicle where the on/off switch was left in the "on" position and the vehicle is in gear).

Embodiments disclosed herein may help prevent unintended operation of mechanical devices. FIG. 1 illustrates one embodiment of an exemplary safety system (10). As shown, safety system (10) comprises an activation mechanism (12), a safety circuit (14), an indicator (16), and a drive system (17) comprising a motor controller (18) and a motor (20). Safety system (10) may be incorporated within any type of suitable motorized device that utilizes an activation mechanism to send a signal to the drive system, including but not limited to an electric vehicle, a press brake, a table saw, a circular saw, a power saw, an electric knife, an electric drill, a set of electric hedge trimmers, and a router. As shown, activation mechanism (12) is configured to communicate with safety circuit (14), safety circuit (14) is configured to communicate with both indicator (16) and drive system (17) via motor controller (18), and motor controller (18) is configured to communicate with motor (20). Motor controller (18) may include a CPU section and a power section. The CPU section may be programmed to control the power section in response to various inputs from input devices, such as the activation mechanism, and the power section may be configured to provide power to the motor in response to the instructions from the CPU section. In some embodiments, the communication between components may be electrical communication. In the illustrated embodiment, safety circuit (14) is positioned between activation mechanism (12) and drive system (117)/motor controller (18) such that when activation mechanism (12) is actuated and produces an activation signal, the activation signal is received by safety circuit (14) before drive system (17)/motor controller (18). Upon receiving the activation signal, safety circuit (14), which may comprise a microprocessor, determines whether or not to allow the activation signal to be communicated to drive system (17)/motor controller (18). In an alternate embodiment, instead of comprising a microprocessor that is external to motor controller (18), safety circuit (14) may be incorporated into the CPU portion of motor controller (18). In such an embodiment, safety circuit (14) would essentially instruct the CPU portion of motor controller (18) to ignore other inputs, including those from the activation mechanism, until the correct master code and/or unlocking code is received.

Activation mechanism (12) may comprise a pedal, trigger, switch, knob, slide or other suitable mechanism that includes a sensor configured to convert mechanical movement into a signal, such as an electrical signal (i.e. an activation signal). The sensor may comprise a switch. Thus, when activation mechanism (12) is actuated, it produces an activation signal. The length of the activation signal may correspond to the length of the actuation/depression of the activation mechanism. In other words, the activation signal may continue as long as the activation mechanism is being actuated/depressed and it will cease when the activation mechanism is no longer being actuated/depressed.

Safety circuit (14) may comprise a microprocessor that includes a CPU programmed to make decisions regarding what to do when it receives inputs, such as activation signals, from activation mechanism (12). Safety circuit (14) may use logic, such as that shown in FIGS. 3 and 4 and described below, to determine whether or not to allow the activation signal to be communicated to drive system (17)/motor controller (18). By way of example only, safety circuit (14) may comprise a microprocessor, including but not limited to a PIC microprocessor or an ATMEL microprocessor, configured to receive inputs, such as activation signals, via serial communication.

In one embodiment, the default operation state for safety circuit (14) is a locked state, which is an operation state wherein the safety circuit (14) causes the drive system (17, 117) to ignore inputs from activation mechanism (12), thereby rendering the device inoperable. Specifically, in embodiments like the one shown in FIG. 1 where safety circuit (14) is incorporated within an electrical device, safety circuit (14) may cause the motor controller (18) to ignore certain inputs, including those from activation mechanism (12), when safety circuit (14) is in a locked state. In embodiments where safety circuit (14) is external to motor controller (18), safety circuit (14) is configured to prevent any activation signals received from activation mechanism (12) from being communicated to the motor controller (18) when safety circuit (14) is in a locked state. In an alternate embodiment where safety circuit (14) is incorporated within the CPU section of motor controller (18), then safety circuit (14) instructs motor controller (18) not to provide power to the motor (20) when safety circuit (14) is in a locked state. Safety circuit (14) may be configured to remain in a locked state until safety circuit (14) receives an unlocking code requiring one or more unlocking pulses from activation mechanism (12).

As shown in FIG. 1, when safety system (10) is incorporated within a motorized device where drive system (17) includes motor controller (18) and motor (20) and safety circuit (14) is in the locked state, safety circuit (14) prevents the activation signal(s) produced by activation mechanism (12) from being communicated to motor controller (18), thereby preventing motor controller (18) from operating motor (20). By way of example only, in embodiments where the motorized device is an electric vehicle, when safety circuit is in the locked state, the motor cannot be operated by depressing the accelerator pedal and, thus, the electric vehicle cannot be propelled by the engine in any direction.

An unlocking pulse can include an activation signal produced when activation mechanism (12) is actuated and released, thereby returning to its default position, in accordance with a pulse time. The pulse time is the predetermined amount of time associated with the unlocking pulse described above. The pulse time may be a maximum amount of time (i.e. the activation mechanism must be actuated and released within 5 seconds), a minimum amount of time (i.e. the activation mechanism must be actuated for at least 5 seconds before being released), or a range (i.e. the activation mechanism must be actuated for at least 5 seconds but released within 10 seconds). By way of example only, in embodiments where the motorized device is an electric vehicle, the unlocking pulse may comprise an activation signal produced when the accelerator (i.e. activation mechanism (12)) is at least partially depressed and released in accordance with the pulse time. The pulse time may vary depending on the application. The pulse time may be suitable to indicate that the user intentionally actuated activation mechanism (12). For example, in one embodiment, the pulse time may be a maximum amount of time of about one second (i.e. the activation mechanism must be actuated and released within 1 second to create an unlocking pulse).

Safety circuit (14) is configured to transition from a locked state to a normal operation state after receiving the unlocking code. An unlocking code can include a predetermined unlocking pulse or sequence of unlocking pulses required to transition safety circuit (14) from a locked state to a normal operation state. The unlocking code may require any number of unlocking pulses suitable to indicate that the user is intentionally trying to operate the motorized device. By way of example only, in some embodiments, the unlocking code requires only a single unlocking pulse. In other embodiments, the unlocking code requires two or more unlocking pulses. In embodiments that require two or more unlocking pulses, safety circuit (14) may further be configured to require that those two or more unlocking pulses be received within a particular amount of time and/or that a certain amount of time does or does not elapse between consecutive unlocking pulses. By way of example only, in one embodiment, the unlocking code may require that three unlocking pulses be received by safety circuit (14) within thirty seconds and that no more than five seconds elapses between consecutive unlocking pulses. Alternatively, in another embodiment, the unlocking code may require that three unlocking pulses be received by safety circuit (14) within thirty seconds and that there is between a five second and a ten second pause between the first and second unlocking pulses.

In addition, in embodiments that require two or more unlocking pulses, safety circuit (14) may further be configured to allow for different pulse times to be associated with individual unlocking pulses that comprise the unlocking code. For example, in an embodiment where the unlocking code requires three unlocking pulses, safety circuit (14) may require that the operator actuate and release the actuation mechanism within 1 second for the first unlocking pulse, that the operator actuate the actuation mechanism for between 5 and 10 seconds before releasing the actuation mechanism for the second unlocking pulse, and that the operator actuate the actuation mechanism for at least 5 seconds before releasing the actuation mechanism for the third unlocking pulse. Of course, alternatively, safety circuit (14) may be configured to associate a single pulse time with each unlocking pulse that comprises an unlocking code. For example, in such an embodiment, safety circuit (14) may require the operator to actuate and release the actuation mechanism within 1 second for each of the two or more unlocking pulses.

After safety circuit (14) receives the unlocking code, then safety circuit (14) enters a normal operation state, which is an operation state wherein the safety circuit (14) allows the drive system (17, 117) to respond to inputs, including those from activation mechanism (12). In other words, when safety circuit (14) is in the normal operation state, the motorized device operates normally. Specifically, in embodiments like the one shown in FIG. 1 where safety circuit (14) is incorporated within an electrical device, safety circuit (14) may allow motor controller (18) to respond to inputs from activation mechanism (12) when safety circuit (14) is in a normal operation state. In embodiments where safety circuit is external to motor controller (18), safety circuit (14) is configured to allow any activation signals received from activation mechanism (12) to be communicated to motor controller (18) when safety circuit (14) is in a normal operation state, thereby allowing the device to operate in a normal manner. In an alternate embodiment where safety circuit (14) is incorporated within the CPU section of motor controller (18), then safety circuit (14) instructs motor controller (18) to respond to inputs, including those from activation mechanism (12), in a normal manner (i.e. provide power to motor (20) in response to an actuation of activation mechanism (12)) when safety circuit (14) is in a normal operation state.

As shown in FIG. 1, when safety system (10) is incorporated within a motorized device where drive system (17) includes motor controller (18) and motor (20) and safety circuit (14) is in the normal operation state, activation signals produced by actuation of activation mechanism (12) pass through safety circuit (14) and are received by motor controller (18), which then processes those signals and other inputs from activation mechanism (12) and operates motor (20) in a normal manner. By way of example only, in embodiments where the motorized device is an electric vehicle, when the safety circuit is in the normal operation state, when a user depresses the accelerator pedal (i.e. the activation mechanism), the motor will be started and the electric vehicle will be propelled by the engine in the selected direction.

In some embodiments, safety circuit (14) only remains in the normal operation state for a predetermined amount of time after receiving the unlocking code. Accordingly, in those embodiments, if safety circuit (14) does not receive a follow-up signal within that predetermined amount of time after receiving the unlocking code, then safety circuit (14) is configured to return to the locked state. A follow-up signal can include an activation signal produced by actuation of activation mechanism (12) subsequent to the unlocking code. In such embodiments, if safety circuit (14) receives a follow-up signal within that predetermined amount of time after receiving the unlocking code, then safety circuit is programmed to remain in the normal operation state thereby allowing the motorized device to continue to operate normally. That predetermined amount of time may be an amount of time suitable to indicate that the operator is intentionally operating the device. For example, the follow-up time may be less than or equal to about 60 seconds, preferably less than or equal to about 30 seconds, more preferably less than or equal to about 10 seconds, and even more preferably less than or equal to about 2 seconds.

In some embodiments, safety circuit (14) may further be configured to require the operator to enter a master code of one or more unlocking pulses before safety circuit (14) will transition from a sleep state into a responsive state. A master code" can include a predetermined unlocking pulse or sequence of unlocking pulses required in order to allow safety circuit (14) to transition from a sleep state to a responsive state. The master code may be different from the unlocking code. By way of example only, the master code may require 4 unlocking pulses be delivered with a pause of at least ten seconds but no more than 20 seconds between the second and third unlocking pulses, while the unlocking code may comprise a single unlocking pulse. A sleep state is an operation state wherein safety circuit (14) is in a locked state and remains in a locked state despite receiving the unlocking code and a responsive state is an operation state wherein safety circuit (14) will transition from a locked state to a normal operation state in response to receiving the unlocking code. An example of safety circuit (14) operating in the responsive state is described above.

In an embodiment requiring a master code, safety circuit (14) will remain in the sleep state until safety circuit (14) receives the master code. Consequently, safety circuit (14) will not transition to a normal operation state, even if the unlocking code is received, unless the master code is received first. After safety circuit (14) receives the master code, then safety circuit (14) will transition from the sleep state to the responsive state, and safety circuit (14) will function as described above (i.e. safety circuit will transition from the locked state to the normal operation state in response to receiving the unlocking code).

After receiving the master code and transitioning from the sleep state to the responsive state, safety circuit (14) may be configured to remain in the responsive state for a certain amount of time (e.g. 1 hour, 8 hours, etc.) before returning to the sleep state and requiring the operator to enter the master code again. In addition to or as an alternative to remaining in the responsive state for a certain amount of time, safety circuit (14) may transition back to the sleep state based on one or more operational factors. For example, even if the certain amount of time has not elapsed, safety circuit (14) may transition from the responsive state to the sleep state if safety circuit (14) determines that the operator has left the position in front of the controls or has become otherwise engaged and is no longer actively operating the motorized device (discussed in more detail below).

A single safety circuit (14) may be able to store and respond to multiple master codes. As a result, multiple authorized operators of a particular motorized device can have his or her own master code. This may help prevent unauthorized use of the motorized device if the master code(s) is (are) known only to the authorized operator(s). An individual master code may be programmable and customizable for each individual operator.

As shown in FIG. 1, safety system (10) comprises an indicator (16). Indicator (16) may be configured to provide audio or visual indications regarding one or more pieces of information about the motorized device and/or safety system (10). By way of example only, indicator (16) may provide audio or visual indications regarding the state of the safety circuit (i.e. whether safety circuit (14) is in a locked state or in a normal operation state), whether safety system (10) has power and is ready to operate, error codes related to various errors associated with safety system (10), and/or whether safety system (10) is in programming mode (described in more detail below). Indicator (16) may comprise any type of device that is suitable to provide an indication to a user, including but not limited to a light element, a sound element, and an alphanumeric display.

In some embodiments, indicator (16) may represent a single indicator configured to provide an audio or visual indication regarding a single piece of information. For example, in such an embodiment, indicator (16) comprises a light, such as an LED or other suitable light, which is illuminated when safety circuit (14) is in a locked state. In such an embodiment, the illuminated indicator (16) may indicate that safety circuit (14) is waiting to receive the unlocking code from the user to transition safety circuit (14) out of the locked state. Alternatively, in such an embodiment, indicator (16) may comprise a light, such as an LED or other suitable light, which is illuminated when safety circuit (14) is in a normal operation state.

Alternatively, in other embodiments, indicator (16) may represent a single indicator configured to provide audio or visual indications regarding multiple pieces of information. For example, in such an embodiment, indicator (16) comprises a single light, such as an LED or other suitable light, which is steadily illuminated red when safety circuit (14) is in a locked state and flashes on and off in a certain sequence when safety circuit (14) is in programming mode. In another embodiment of this type, indicator (16) may comprise an alphanumeric display configured to provide messages or instructions to a user regarding multiple pieces of information, such as "DEVICE IS LOCKED", "ENTER CORRECT PULSE TO UNLOCK" and/or "ERROR CODE 101" for example.

Alternatively, in still other embodiments, indicator (16) may represent a plurality of indicators each configured to provide audio or visual indications regarding a particular piece of information. For example, in such an embodiment, indicator (16) comprises a first light, such as an LED or other suitable light, which is steadily illuminated red when safety circuit (14) is in a locked state and a second light, such as an LED or other suitable light, which is steadily illuminated green when safety system (10) has power and is ready to operate.

In still other embodiments, indicator (16) may provide an audible indication of the locked/unlocked status of safety circuit (14) or some other desired piece of information regarding the motorized device. For instance, in such an embodiment, indicator (16) may provide a beep or series of beeps to indicate that safety circuit (14) is in the locked state and remain silent when safety circuit (14) is not in the locked state (or vice versa).

In some embodiments, the audio or visual indications may be provided whenever the motorized device is turned on and ready to be operated or, alternatively, the indications may be provided in response to one or more environmental factors, including but not limited to the user assuming a position wherefrom the user can operate the motorized device (i.e. sitting on the driver's seat of an electric vehicle, standing in front of the controls of a piece of industrial equipment, etc.) and the user initially depressing the activation mechanism (12). The number and type of indicators required, the particular pieces of information associated with the indicators, and the manner in which the indications are provided, such as whether a light indicator is illuminated when safety circuit (14) is in a locked state and not illuminated when safety circuit (14) is not in a locked state or vice versa, will vary based on the particular application.

Figure 2:
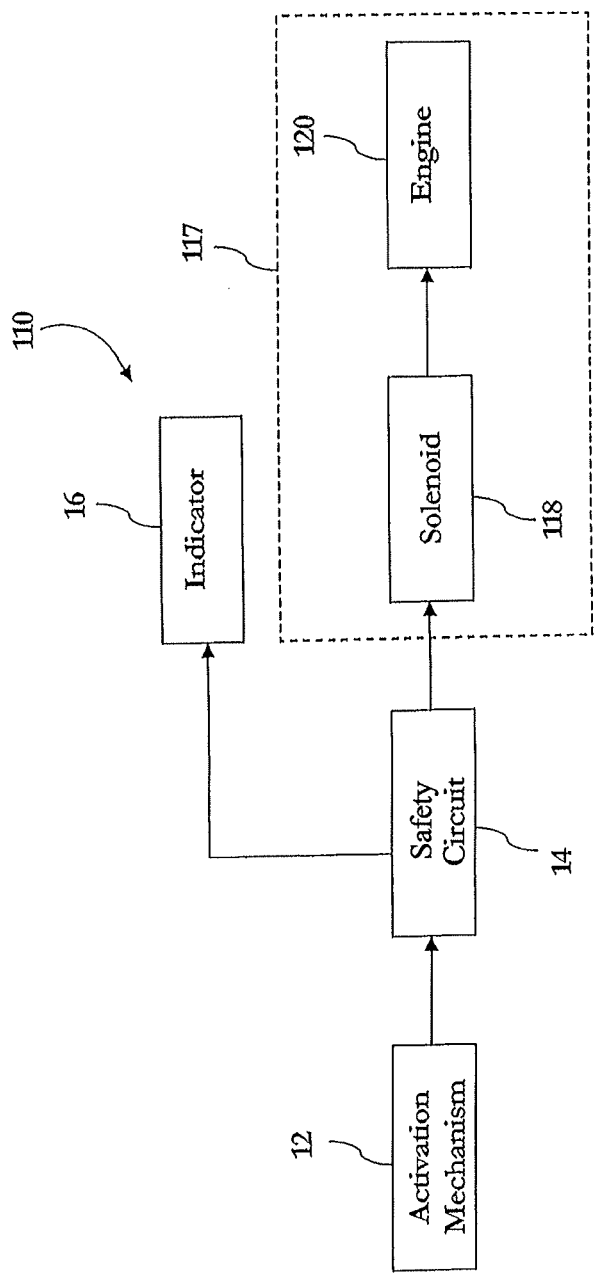
FIG. 2 depicts a block diagram of a safety system, according to a second embodiment of the present invention.

FIG. 2 illustrates an alternate embodiment of a safety system (110) which is configured to be used as part of a gas-powered device that includes an engine (120) that starts when the activation mechanism (12) is actuated, including but not limited to gas-powered vehicles such as riding lawn mowers. As shown, safety system (110) comprises an activation mechanism (12), a safety circuit (14), an indicator (16), and drive system (117) comprising a solenoid (118), and an engine (120). Except for the inclusion of solenoid (118) and engine (120) in the place of motor controller (18) and motor

(20) respectively, safety system (110) shown in FIG. 2 is substantially similar to safety system (10) shown in FIG. 1 and described above.

As shown, activation mechanism (12) is configured to communicate with safety circuit (14), safety circuit (14) is configured to communicate with both indicator (16) and drive system (117) via solenoid (118), and solenoid (118) is configured to engage engine (120). In some embodiments, the communication between components may be electrical communication. In the illustrated embodiment, safety circuit (14) is positioned between activation mechanism (12) and drive system (117)/solenoid (118) such that when activation mechanism (12) is actuated and produces an activation signal, the activation signal is received by safety circuit (14) before drive system (117)/solenoid (118). Upon receiving the activation signal, safety circuit (14), which may comprise a microprocessor, determines whether or not to allow the activation signal to be communicated to drive system (117)/solenoid (118).

Activation mechanism (12) may comprise a pedal, trigger, switch, knob, slide or other suitable mechanism that includes a sensor configured to convert mechanical movement into an electrical signal (i.e. an activation signal). The sensor may comprise a switch. Safety circuit (14) may comprise a microprocessor programmed to make decisions regarding what to do when it receives inputs, such as activation signals, from activation mechanism (12). Safety circuit (14) may use logic, such as that shown in FIGS. 3 and 4 and described below, to determine whether or not to allow the activation signal to be communicated to drive system (117)/solenoid (118). As discussed above, safety circuit (14) may comprise a microprocessor, including but not limited to a PIC microprocessor or an ATMEL microprocessor, configured to receive inputs, such as activation signals, via serial communication.

In one embodiment similar to safety system (10) described above, safety circuit (14) of safety system (110) is also configured to remain in a locked state until safety circuit (14) receives an unlocking code from activation mechanism (12). Specifically, when safety system (110) is incorporated within a gas-powered device where drive system (117) includes solenoid (118) and engine (120) and safety circuit (14) is in the locked state, safety circuit (14) prevents the activation signal (s) produced by activation mechanism (12) from being communicated to solenoid (118), thereby preventing the engine (120) from being started and operating in a normal manner. By way of example only, in embodiments where the gas-powered device is a gas-powered vehicle, when the safety circuit is in the locked state, the engine cannot be started by depressing the accelerator pedal and, thus, the gas-powered vehicle cannot be propelled by the engine in any direction.

Similar to safety system (10), the unlocking code required by safety circuit (14) in safety system (110) to transition from a locked state to a normal operation state may require any number of unlocking pulses suitable to indicate that the user is intentionally trying to operate the motorized device.

After safety circuit (14) receives the unlocking code, then safety circuit (14) enters a normal operation state, which allows the gas-powered device to operate normally. Specifically, when safety system (110) is incorporated into a gas-powered device where drive system (117) includes solenoid (118) and engine (120) and safety circuit (14) is in the normal operation state, activation signals produced by actuation of activation mechanism (12) pass through safety circuit (14) and are received by solenoid (118), which allows solenoid (118) to engage and start engine (120). Solenoid (118) and engine (120) then operate in a normal manner in response to activation signals and other inputs from activation mechanism (12) and/or other input devices. By way of example only, in embodiments where the gas-powered device is a gas-powered vehicle, when the safety circuit is in the normal operation state, when a user depresses the accelerator pedal (i.e. the activation mechanism), the engine will be started and the gas-powered vehicle will be propelled by the engine in the selected direction and engine will continue to respond in a normal manner to additional depressions of the accelerator pedal as long as the safety circuit remains in the normal operation state.

Similar to system (10) described above, in some embodiments of safety system (110), safety circuit (14) only remains in the normal operation state for a predetermined amount of time after receiving the unlocking code. Accordingly, in those embodiments, if safety circuit (14) does not receive a follow-up signal within that predetermined amount of time after receiving the unlocking code, then safety circuit (14) is configured to return to the locked state. In such embodiments, if safety circuit (14) receives a follow-up signal within that predetermined amount of time after receiving the unlocking code, then the safety circuit is programmed to remain in the normal operation state thereby allowing the gas-powered device to continue to operate normally.

Similar to embodiments of safety system (10) described above, in some embodiments of safety system (110), safety circuit (14) may be configured to require the operator to enter a master code of one or more unlocking pulses before safety circuit (14) will transition from a sleep state into a responsive state. The description of the master code provided above applies equally to embodiments of safety system (110). Accordingly, that description will not be repeated.

Indicator (16) shown in FIG. 2 may have the same functions and features of indicator (16) shown in FIG. 1 and described above. Accordingly, the description of indicator (16) will not be repeated.

Safety systems (10, 110) are electrically connected to a power source (not shown) capable of powering the components of safety system (10, 110). In some embodiments, the power source for the safety system may also be the power source for the drive system (17, 117), such as a battery or AC power delivered via a power cord. In embodiments where the power source for the drive system provides AC power, then safety system (10, 110) may also include a rectifier circuit or other similar device configured to convert the AC power to DC power for use by the components of the safety system. In other embodiments, safety system (10, 110) may include an independent power source, such as a lithium battery or other suitable power source, capable of providing the required power to safety circuit (14) and the other components of safety system (10, 110).

Figure 3:
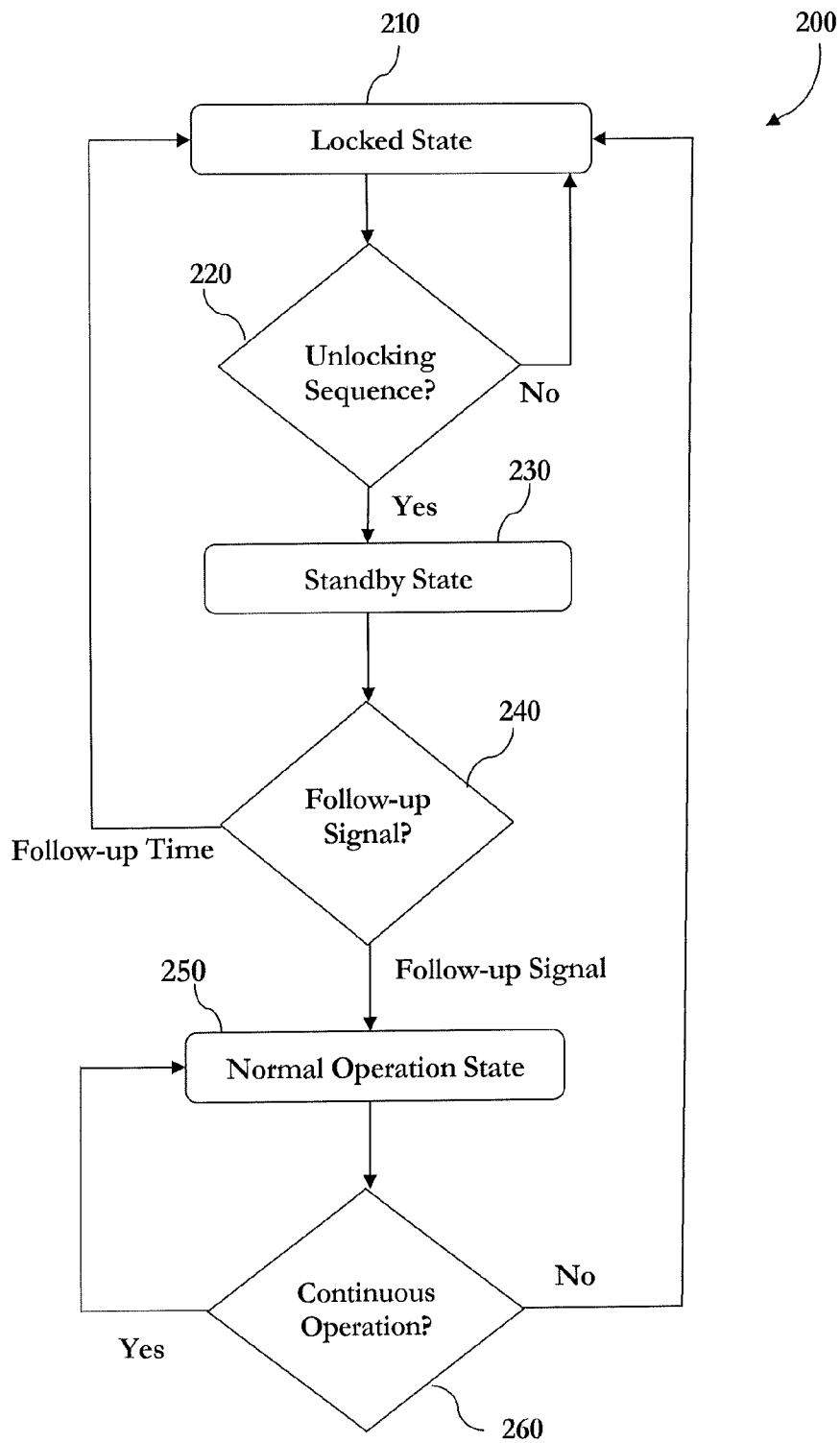
FIG. 3 is a flow diagram that illustrates exemplary logic that may be employed by the safety circuit of the safety systems of FIG. 1 and FIG. 2, according to one embodiment of the present invention.

FIG. 3 is a flow diagram that illustrates one example of logic that may be employed by safety circuit (14) of safety system (10) of FIG. 1 and safety system (110) of FIG. 2. In the routine (200) shown in FIG. 3, the default operation state for the safety circuit (14) is a locked state, as shown by Locked State Step (210). In this embodiment, safety circuit (14) may comprise one or more timers and/or counters that may be used to execute various steps within routine (200). When safety circuit (14) is in Locked State Step (210) and safety circuit (14) receives an activation signal or series of activation signals from activation mechanism (12), then safety circuit (14) executes Unlocking Code Check (220). During Unlocking Code Check (220), safety circuit (14) compares the activation signal or series of activation signals it just received to the predetermined unlocking code to determine if the activation signal or series of activation signals from activation mechanism (12) corresponds to the correct unlocking code. By way of example only, during Unlocking Code Check (220), if the unlocking code requires only a single unlocking pulse, then safety circuit (14) may determine if the user actuated activation mechanism (12) and then released activation mechanism (12) in accordance with the pulse time. In embodiments where the unlocking code requires two or more unlocking pulses, safety circuit (14) is configured to determine both whether the individual activation signals satisfy the requirements to constitute an unlocking pulse (e.g. if the user actuated activation mechanism (12) and then released activation mechanism (12) in accordance with the pulse time) and whether, collectively, the predetermined number of unlocking pulses have been received during the Unlocking Code Check (220). In addition, in embodiments where the unlocking code requires two or more unlocking pulses, safety circuit (14) may also be configured to determine if the two or more unlocking pulses are received within a particular amount of time and/or that a certain amount of time did or did not elapse between consecutive unlocking pulses during the Unlocking Code Check (220).

If safety circuit (14) determines that the activation signal(s) it just received does not correspond to the unlocking code, then safety circuit (14) returns to Locked State Step (210) thereby keeping the device from operating in a normal manner and safety circuit (14) waits to receive the next activation signal from activation mechanism (12) and subsequently repeat Unlocking Code Check (220). Alternatively, if safety circuit (14) determines that the activation signal(s) it just received corresponds to the unlocking code, then safety circuit (14) proceeds to Standby State Step (230) and safety circuit (14) transitions from the locked state to the normal operation state, thereby allowing the device to operate normally.

Safety circuit (14) remains in Standby State Step (230) until one of two triggering events occurs. Specifically, safety circuit (14) remains in Standby State Step (230) until either safety circuit (14) receives a follow-up signal or a predetermined amount of time elapses, whichever occurs first. The follow-up time is the predetermined amount of time associated with Standby State Step (230) described above. Upon the occurrence of one of these two triggering events, then safety circuit (14) executes Follow-Up Signal Check (240). During Follow-Up Signal Check (240), safety circuit (14) determines which of the two triggering events occurred. If safety circuit (14) determines that Follow-Up Signal Check (240) was triggered because the follow-up time has elapsed, then safety circuit (14) returns to Locked State Step (210) and begins executing routine (200) again. Accordingly, safety circuit (14) transitions from the normal operation state to the locked state and safety circuit (14) waits to receive the next activation signal from activation mechanism (12) and subsequently repeat Unlocking Code Check (220). Alternatively, if safety circuit (14) determines that Follow-Up Signal Check (240) was triggered because safety circuit (14) received a follow-up signal, then safety circuit (14) proceeds to Normal Operation State Step (250) and safety circuit (14) stays in the normal operation state, thereby allowing the device to operate normally.

Essentially, Follow-Up Signal Check (240) ensures that the user can only operate the device if he or she actuates activation mechanism (12) again within the follow-up time after initially providing the correct unlocking code by actuating and releasing activation mechanism (12). By way of example only, the follow-up time may be about 2 seconds. In such an embodiment, if the user does not actuate activation mechanism (12) within 2 seconds after initially providing the unlocking code, then safety circuit (14) returns to the locked state. Of course, any follow-up time suitable to indicate that the user intentionally actuated activation mechanism (12) may be used.

Safety circuit (14) remains in the normal operation state and, consequently, the device can be operated normally, as long as safety circuit (14) remains in Normal Operation State Step (250). Safety circuit (14) is configured to periodically execute Continuous Operation Check (260) while safety circuit (14) is in Normal Operation State Step (250). During Continuous Operation Check (260), safety circuit (14) determines if the operator is continuing to actively operate the device. For example, Continuous Operation Check (260) may determine if the operator has either left the position in front of the controls or has become otherwise engaged and is no longer actively operating the device. Safety circuit (14) may make such a determination based on feedback from one or more detection devices (e.g. sensors, indicators, timers or other similar devices).

By way of example only, in some embodiments, safety system (10, 110) may further comprise a sensor configured to detect the presence of the operator in front of the controls for the device. In one such embodiment, the detection device may comprise a pressure sensor located in a seat or in a floor mat positioned in front of the controls and configured to detect when an operator is sitting in the seat or standing on the mat. In another such embodiment, the detection device may comprise an ultrasonic motion sensor directed to the area in front of the controls and configured to determine if an operator is present by detecting movement in that area. In yet another such embodiment, the detection device may comprise a thermal sensor directed to the area in front of the controls and configured to determine if an operator is present by detecting thermal activity in that area. Other types of detection devices suitable to communicate with safety circuit (14) and determine if an operator has either left the position in front of the controls or has become otherwise engaged and is no longer actively operating the device may also be used. Some embodiments may even include more than one type of detection device. By way of example only, these embodiments may also include a timer to incorporate a timing element into the determination by safety circuit (e.g. whether the detection device has detected the operator's presence within the previous 30 seconds or whether the detection device has detected movement by the operator within the previous 30 seconds).

If safety circuit (14) receives feedback from a detection device during Continuous Operation Check (260) that indicates that the operator has either left the position in front of the controls or has become otherwise engaged and is no longer actively operating the device, then safety circuit (14) returns to Locked State Step (210) and begins executing routine (200) again. Alternatively, if safety circuit (14) does not receive such feedback during Continuous Operation Check (260), then safety circuit (14) returns to Normal Operation State Step (250).

In one embodiment, the detection device may comprise a timer configured to record the amount of time that has elapsed since the last activation signal from activation mechanism (12) ended. In this embodiment, during Continuous Operation Check (260), safety circuit (14) uses the feedback from that timer to determine if a predetermined amount of time has elapsed since the last activation signal from activation mechanism (12) ended. The continuous operation time is the predetermined amount of time associated with Continuous Operation Check (260) described above. If safety circuit (14) determines that the continuous operation time has elapsed since the last activation signal from activation mechanism (12) ended, then safety circuit (14) returns to Locked State Step (210) and begins executing routine (200) again. Accordingly, safety circuit (14) transitions from the normal operation state to the locked state and safety circuit (14) waits to receive the next activation signal from activation mechanism (12) and subsequently repeat Unlocking Code Check (220). Alternatively, if safety circuit (14) determines that the continuous operation time has not elapsed since the last activation signal from activation mechanism (12) ended, then safety circuit (14) returns to Normal Operation State Step (250). Accordingly, safety circuit (14) remains in the normal operation state and waits to execute Continuous Operation Check (260) again.

Essentially, in this embodiment, Continuous Operation Check (260) ensures that safety circuit remains in the normal operation state and the device continues to operate normally, provided that the time between actuations of activation mechanism (12) does not exceed the continuous operation time. By way of example only, the continuous operation time may be about 30 seconds. In such an embodiment, if the user fails to actuate activation mechanism (12) during a period of more than about 30 seconds, then safety circuit (14) returns to the locked state. Of course, any continuous operation time suitable to indicate that the user is no longer actively operating the device may be used. For example, in embodiments where the device comprises a vehicle and the activation mechanism (12) comprises an accelerator pedal, safety circuit (14) will remain in the normal operation state and the vehicle will continue to operate normally until the user fails to depress the accelerator during the continuous operation time. In such an embodiment, failure to depress the accelerator during the continuous operation time may indicate that the user has either left the vehicle or has become otherwise engaged and is no longer actively operating the vehicle.

Figure 4:
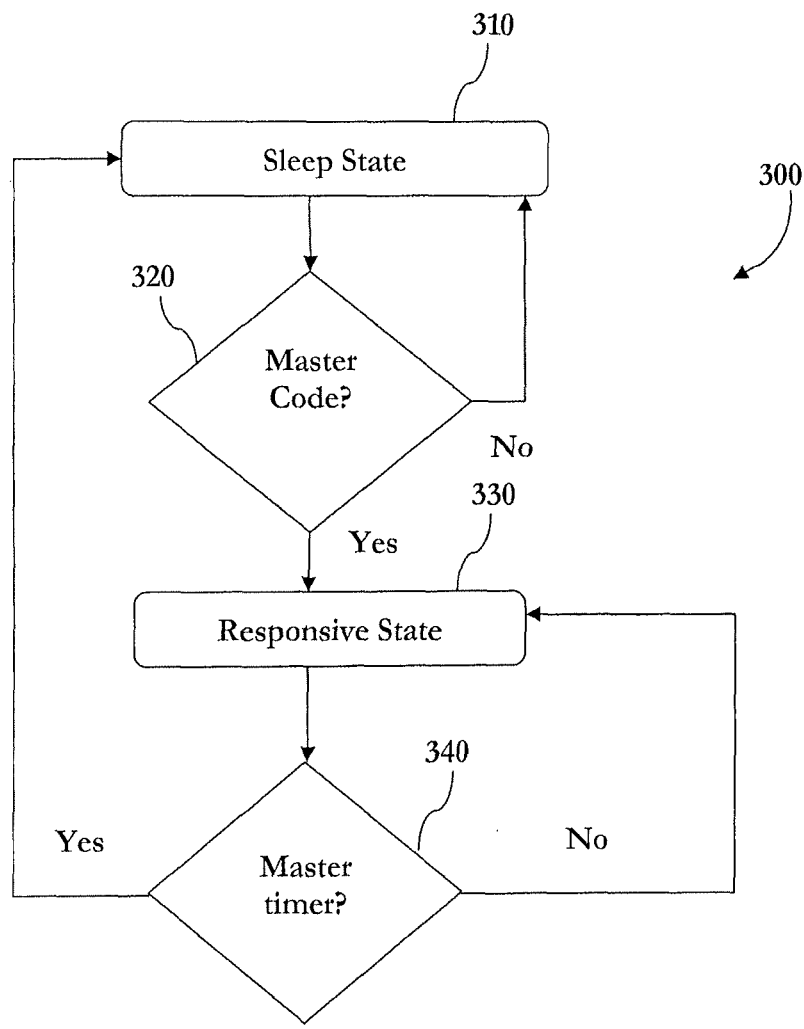
FIG. 4 is a flow diagram that illustrates alternate exemplary logic incorporating a master code that may be employed by the safety circuit of the safety systems of FIG. 1 and FIG. 2, according to one embodiment of the present invention.

FIG. 4 is a flow diagram that illustrates another example of logic that may be employed by safety circuit (14) of safety system (10) of FIG. 1 and safety system (110) of FIG. 2. Specifically, routine (300) shown in FIG. 4 may be used in embodiments that require the operator to enter a master code before the device will respond to the unlocking code. In routine (300), the default operation state is a sleep state, as shown by Sleep State Step (310). In this embodiment, safety circuit (14) may comprise one or more timers and/or counters that may be used to execute various steps within routine (300). When safety circuit (14) is in Sleep State Step (310) and safety circuit (14) receives an activation signal or series of activation signals from activation mechanism (12), then safety circuit (14) executes Master Code Check (320). During Master Code Check (320), safety circuit (14) compares the activation signal or series of activation signals it just received to the predetermined master code to determine if the activation signal or series of activation signals from activation mechanism (12) corresponds to the correct master code.

If safety circuit (14) determines that the activation signal(s) it just received does not correspond to the master code, then safety circuit (14) returns to Sleep State Step (310) thereby preventing safety circuit (14) from responding to the unlocking code and, ultimately, keeping the device from operating in a normal manner. Alternatively, if safety circuit (14) determines that the activation signal(s) it just received corresponds to the master code, then safety circuit (14) transitions from the sleep state to a responsive state, as shown by Responsive State Step (330). While in Responsive State Step (330), safety circuit (14) may execute a routine, such as routine (200) described above, where safety circuit (14) can transition from a locked state to a normal operation state in response to receiving the appropriate unlocking code.

In routine (300), safety circuit (14) remains in Responsive State Step (330) for a predetermined amount of time. As shown, safety circuit (14) periodically performs Master Timer Check (340) to determine if that predetermined amount of time has elapsed. The master time is the predetermined amount of time associated with Master Timer Check (330) described above. For example, safety circuit (14) may be configured to remain in Responsive State Step (330) for one hour or any other desired amount of time after receiving the master code. While performing Master Timer Check (330), if safety circuit (14) determines that the master time has not elapsed, then safety circuit (14) returns to Responsive State Step (330). Alternatively, if safety circuit (14) determines that the master time has elapsed, then safety circuit (14) returns to Sleep State Step (310), thereby returning safety circuit (14) to a sleep state. In some embodiments, rather than immediately returning safety circuit (14) to a sleep state and thereby rendering the vehicle temporarily inoperable after the master time has elapsed, safety circuit (14) may be configured to remain in Responsive State Step (330) until the next time the safety circuit (14) determines the operator is no longer actively operating the device. For example, safety circuit (14) may remain in Responsive State Step (330) until the next time safety circuit (14) executes Continuous Operation Check (260) and determines that the operator is no longer actively operating the device.

In some embodiments (not shown), instead of or in addition to Master Timer Check (340), the routine employed by safety circuit (14) may cause safety circuit (14) to transition from a responsive state back to a sleep state each time (or after a certain number of times) safety circuit (14) executes Continuous Operation Check (260) and determines that the operator is no longer actively operating the device. By way of example only, safety circuit (14) may execute a routine wherein safety circuit (14) merely transitions back to a locked state after the first two times the operator fails to actuate the activation mechanism within the continuous operation time. But, after the operator fails to actuate the activation mechanism within the continuous operation time a third time, then safety circuit (14) transitions back to a sleep state and the operator must enter the master code and the unlocking code again before being able to operate the device again.

It will be appreciated that certain elements of routines (200, 300) may be fully programmable, thereby allowing a user to determine appropriate values and even vary values depending on the particular application. For example, elements that may be fully programmable include but are not limited to the number, timing and sequence of unlocking pulses required for the unlocking code, the number, timing and sequence of unlocking pulses required for the master code, the pulse time, the follow-up time, and the continuous operation time. For example, in one embodiment, the CPU of safety circuit (14) is programmed through a serial link using any suitable terminal program. This type of embodiment may be beneficial because there is no need for any special software to be loaded and set up on the host computer. Most Operating Systems have some type of terminal program as part of the basic Operating System Package. For example, Microsoft Windows Operating System has a terminal program called Hyper Terminal, which may be used to program the parameters in this type of embodiment.

In this embodiment, the communication is done using ASCII characters and converted by the CPU of safety circuit (14) to either bit or word variables which are used by the program. The default communication protocol may be, but is not necessarily limited to, Baud Rate 4800, Data bits 8, Stop bits 1, Parity—none, and Flow control—none. Once the parameters are accepted by the CPU, it may store them in non-volatile EEPROM memory.

Figure 5:
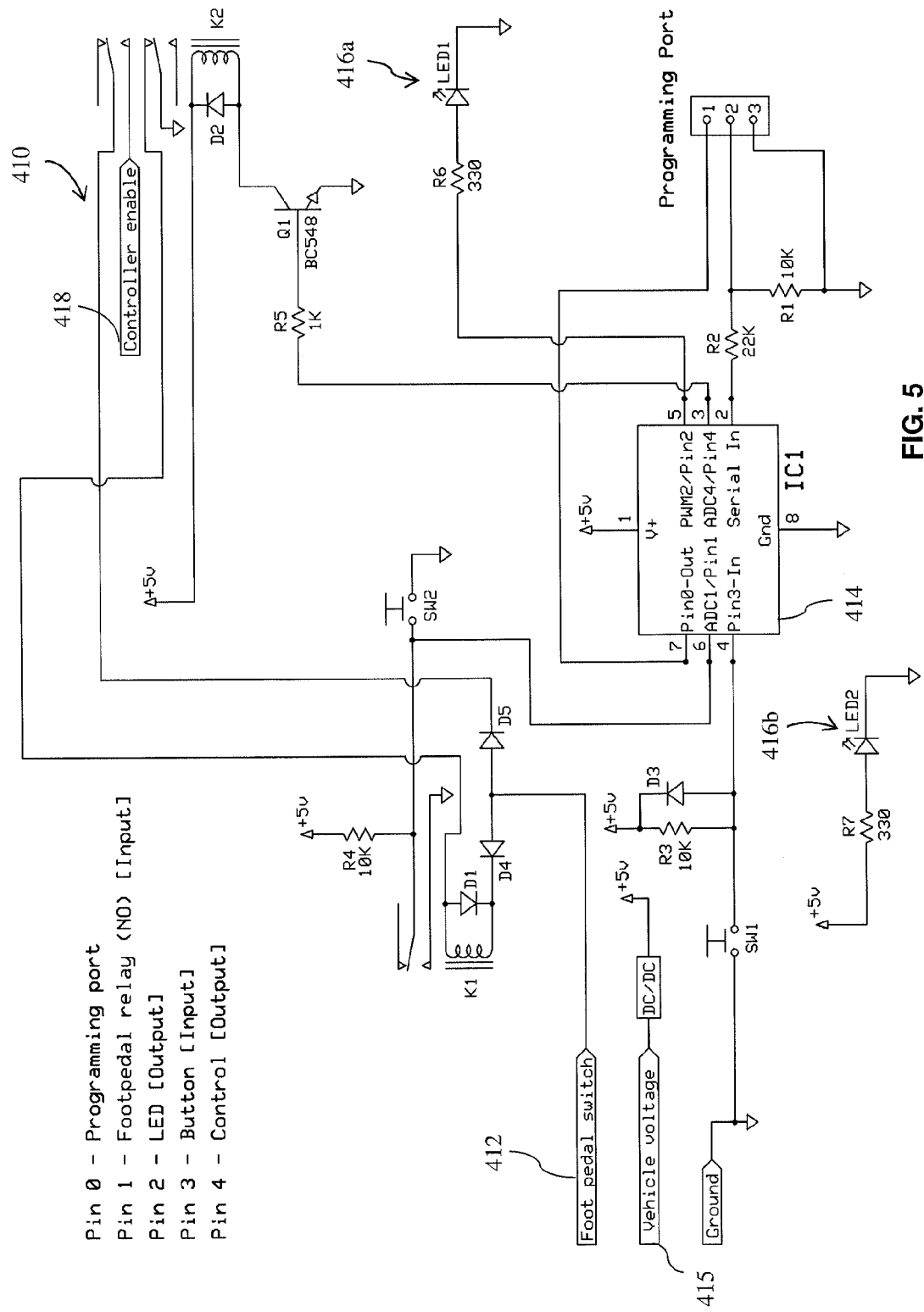
FIG. 5 depicts a circuit diagram of the safety system of FIG. 1, according to one embodiment of the present invention.

FIG. 5 depicts a circuit diagram for an embodiment where safety system (410) is incorporated within an electric vehicle. As shown, safety system (410) comprises an activation mechanism (412), a safety circuit (414), a first indicator (416a), a second indicator (416b), and a controller enable pin (418) of a motor controller (not shown). In the illustrated embodiment, safety system (410) receives its power from power source (415), which may comprise a battery configured to provide DC power and is labeled as "Vehicle voltage" in FIG. 5. The motor, which is in communication with the motor controller, is not shown. In the illustrated embodiment, activation mechanism (412) comprises a foot pedal switch. In one embodiment, the foot pedal switch may be associated with the accelerator pedal on the electric vehicle. In this embodiment, safety circuit (414) comprises a microprocessor that is external to the motor controller. The microprocessor may comprise an IC1 microprocessor or any other suitable type of microprocessor. In other embodiments, instead of incorporating an external microprocessor as shown, safety circuit (14) may be incorporated into the CPU portion of the motor controller.

As shown, safety circuit (414) is configured to receive an input (an activation signal) from activation mechanism (412). When safety circuit (414) receives the correct unlocking code from activation mechanism (412), safety circuit (414) transitions to the normal operation state, thereby allowing the electric vehicle to operate normally. Specifically, upon receiving the unlocking code, safety circuit (414) closes relay (K2) which connects activation mechanism (412) directly to the controller enable pin (418), thereby allowing a subsequent activation signal (e.g. a follow-up signal) to be communicated to controller enable pin (418). As a result, when the subsequent activation signal is received by controller enable pin (418), then controller enable pin (418) is enabled and the motor controller will process additional inputs, including those from activation mechanism (412), and operate the motor accordingly. In the illustrated embodiment, relay (K2) remains open until safety circuit (414) receives the unlocking code from activation mechanism (412). While relay (K2) remains open, the controller enable pin cannot receive an activation signal, and, as a result, cannot be enabled. When controller enable pin is not enabled, the motor controller will not operate the motor in response to additional inputs, including those from activation mechanism (412).

In addition, when relay (K2) is closed, it turns off first indicator (416a), which comprises an LED light, thereby indicating that the safety circuit (414) is no longer in the locked state and that safety circuit (414) is in the normal operation state. First indicator (416a) may also be configured to display an error code or indicate that safety circuit (412) is in a program mode in which the default settings can be changed. The second indicator (416b), which also comprises an LED light, may be configured to indicate that system (410) has power and is ready to operate.

In one exemplary embodiment, the safety system is incorporated within an electric vehicle, such as a golf cart or other electric cart, such as those used in the mining industry. Similar to safety system (10) shown in FIG. 1 and described above, the safety system in this embodiment comprises an activation mechanism, a safety circuit, an indicator, and a drive system comprising a motor controller, and a motor. In this embodiment, the activation mechanism comprises a foot pedal, particularly the accelerator pedal of the electric vehicle, and the safety circuit comprises a microprocessor. Also in this embodiment, the indicator comprises an LED light, the motor controller comprises a CPU, and the motor comprises an electric motor. For example, the motor may comprise either an AC motor or a DC motor. Similar to safety system (10), in this embodiment, the activation mechanism is in communication with the safety circuit, the safety circuit is in communication with both the indicator and the drive system/motor controller, and the motor controller is in communication with the motor.

In this particular embodiment, the safety circuit is programmed to remain in a locked state until it receives the correct unlocking code. In this embodiment, the correct unlocking code requires a single unlocking pulse, and the correct unlocking pulse is created when the user depresses the accelerator pedal and then releases the accelerator pedal within one second. Accordingly, in this embodiment, when the user depresses the accelerator pedal and releases it within one second, then the unlocking pulse (which also comprises the unlocking code in this embodiment) is sent from the accelerator pedal to the safety circuit and the safety circuit temporarily transitions from the locked state to a normal operation state and awaits a follow-up signal. Subsequently, if the user sends a follow-up signal within the follow-up time (i.e. depresses the accelerator pedal again within 2 seconds of releasing the accelerator pedal), then the safety circuit allows the follow-up signal to be communicated to the drive system via the motor controller, the motor controller starts the motor, and the vehicle operates in a normal manner (i.e. the motor responds to depressions of the accelerator pedal and propels the vehicle in the selected direction). If the user fails to send a follow-up signal within the follow-up time, then the safety circuit returns to the locked state and waits to receive the correct unlocking code again.

In this embodiment, when the safety circuit is in the normal operation state and the vehicle is operating normally, the safety circuit periodically checks to make sure the user is still actively operating the vehicle. If the user fails to depress the accelerator pedal during the continuous operation time, which may be about 30 seconds in this embodiment, then the safety circuit transitions back to the locked state and waits to receive the correct unlocking code again. As long as the user continues to periodically depress the accelerator pedal, then the safety circuit remains in the normal operation state and allows the vehicle to operate normally. For example, in this embodiment, as long as the accelerator pedal is depressed at least once every 30 seconds, then the safety circuit will remain in the normal operation state and the vehicle will operate normally.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:

1. A safety system comprising:
   an activation mechanism, wherein the activation mechanism is configured to produce an activation signal in response to an actuation of the activation mechanism;
   a drive system;

a safety circuit, wherein the safety circuit is in communication with the activation mechanism such that the activation signal is received by the safety circuit, wherein the safety circuit is in selective communication with at least a portion of the drive system, wherein the safety circuit is programmed to transition from a locked state to a normal operation state in response to receiving an unlocking code, wherein the unlocking code comprises at least one unlocking pulse which comprises at least one activation signal produced when the activation mechanism is actuated and released in accordance with a predetermined amount of time, wherein the locked state comprises an operation state wherein the safety circuit renders the drive system inoperable, wherein the circuit is further programmed to transition from the normal operation state back to the locked state unless the circuit receives a follow-up signal within a predetermined amount of time after receiving the unlocking code.

2. The safety system of claim 1, wherein the unlocking code comprises a sequence of at least two unlocking pulses.

3. The safety system of claim 1, wherein the safety circuit is further programmed to transition from the normal operation state to the locked state in response to the circuit failing to receive an activation signal for a predetermined amount of time after transitioning from the locked state to the normal operation state.

4. The safety system of claim 1, wherein the safety circuit is further programmed to transition from a sleep state to a responsive state in response to receiving a master code.

5. The safety system of claim 4, wherein the master code comprises a sequence of at least two unlocking pulses; wherein the unlocking code comprises at least one unlocking pulse; wherein the sequence of at least two unlocking pulses of the master code is different from the at least one unlocking pulse of the unlocking code.

6. The safety system of claim 4, wherein the safety circuit is further programmed to transition from the responsive state to the sleep state after a first predetermined amount of time has elapsed since the circuit transitioned from the sleep state to the responsive state.

7. The safety system of claim 4, wherein the safety circuit is further configured to transition from the responsive state to the sleep state upon the earlier of:
  (i) a first predetermined amount time elapsing since the safety circuit transitioned from the sleep state to the responsive state; and
  (ii) the safety circuit failing to receive an activation signal for a second predetermined amount of time after transitioning from the sleep state to the responsive state.

8. The safety system of claim 1, wherein the safety circuit is incorporated within a CPU section of a motor controller.

9. A safety system comprising:
  an activation mechanism, wherein the activation mechanism is configured to produce an activation signal in response to an actuation of the activation mechanism;
  a safety circuit, wherein the safety circuit is in communication with the activation mechanism such that the activation signal is received by the safety circuit; and
  a drive system, wherein the safety circuit is in selective communication with at least a portion of the drive system;
  wherein the safety circuit is programmed to transition from a locked state to a normal operation state in response to receiving an unlocking code, wherein the locked state comprises an operation state wherein the safety circuit renders the drive system inoperable, wherein the safety circuit is further programmed to transition from the normal operation state back to the locked state unless the circuit receives a follow-up signal within a predetermined amount of time after receiving the unlocking code, wherein the follow-up signal comprises an activation signal produced in response to actuation of the activation mechanism subsequent to the actuation that produced the unlocking code.

10. The safety system of claim 9, wherein the drive system comprises a motor controller and a motor.

11. The safety system of claim 10, wherein the safety circuit is in communication with the motor controller and the motor controller is in communication with the motor.

12. The safety system of claim 11, wherein the safety circuit is programmed to prevent the activation signal from being communicated from the activation mechanism to the motor controller when the safety circuit is in the locked state.

13. The safety system of claim 12, wherein the safety circuit is further programmed to allow the activation signal to be communicated from the activation mechanism to the motor controller when the safety circuit is in the normal operation state.

14. The safety system of claim 9, wherein the drive system comprises a solenoid and an engine.

15. The safety system of claim 14, wherein the safety circuit is in communication with the solenoid and the solenoid is in communication with the engine.

16. The safety system of claim 9, wherein the activation mechanism comprises a foot pedal.

17. The safety system of claim 9, wherein the safety circuit is programmed to transition from the normal operation state to the locked state in response to the safety circuit failing to receive an activation signal for a second predetermined amount of time after receiving a previous activation signal.

18. The safety system of claim 9 further comprising an indicator, wherein the indicator is in communication with the safety circuit.

19. The safety system of claim 18, wherein the indicator is configured to provide an indication regarding the current operation state of safety circuit.

20. An electric vehicle comprising:
  an accelerator pedal, wherein the accelerator pedal is configured to produce an activation signal in response to a depression of the accelerator pedal;
  a safety circuit, wherein the safety circuit is in communication with the accelerator pedal such that the activation signal is received by the safety circuit, wherein the safety circuit is programmed to operate in either a locked state or a normal operation state;
  a motor controller, wherein the motor controller is in selective communication with the safety circuit; and
  an electric motor, wherein the electric motor is in communication with the motor controller;
  wherein the safety circuit is programmed to prevent the activation signal from being communicated to the motor controller when the safety circuit is operating in the locked state;
  wherein the safety circuit is programmed to allow the activation signal to be communicated to the motor controller when the safety circuit is operating in the normal operation state;
  wherein the safety circuit is programmed to transition from the locked state to the normal operation state in response to receiving an unlocking code, wherein the safety circuit is further programmed to transition from the normal operation state back to the locked state unless the circuit receives a follow-up signal within a predetermined amount of time after receiving the unlocking code.

21. An electric power tool comprising:
- an activation mechanism, wherein the activation mechanism is configured to produce an activation signal in response to an actuation of the activation mechanism;
- a safety circuit, wherein the safety circuit is in communication with the activation mechanism such that the activation signal is received by the safety circuit, wherein the safety circuit is programmed to operate in one of a first operation state and a second operation state;
- a motor controller, wherein the motor controller is in selective communication with the safety circuit;
- a motor, wherein the motor is in communication with the motor controller;
- wherein the safety circuit is programmed to prevent the activation signal from being communicated to the motor controller when the safety circuit is operating in the first operation state;
- wherein the safety circuit is programmed to allow the activation signal to be communicated to the motor controller when the safety circuit is operating in the second operation state;
- wherein the safety circuit is programmed to transition from the first operation state to the second operation state in response to receiving an unlocking code, wherein the safety circuit is further programmed to transition from the second operation state back to the first operation state unless the circuit receives a follow-up signal within a predetermined amount of time after receiving the unlocking code.

* * * * *